April 6, 1954    M. SCIUTO    2,674,492
LAWN SPRINKLER
Filed May 19, 1953    2 Sheets-Sheet 1
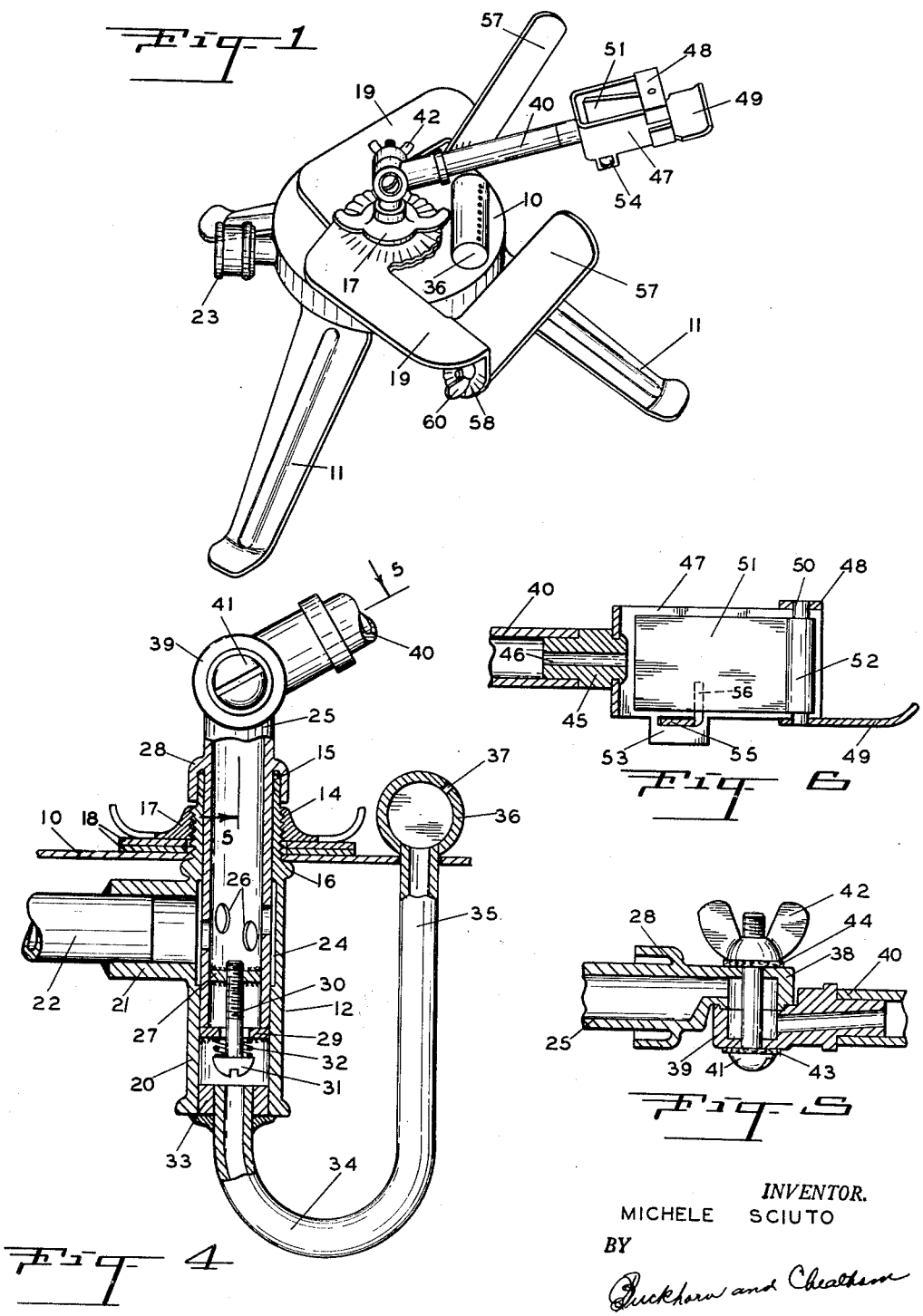
INVENTOR.
MICHELE SCIUTO
BY
Duckhorn and Cheatham
ATTORNEY April 6, 1954
M. SCIUTO
2,674,492
LAWN SPRINKLER
Filed May 19, 1953
2 Sheets-Sheet 2
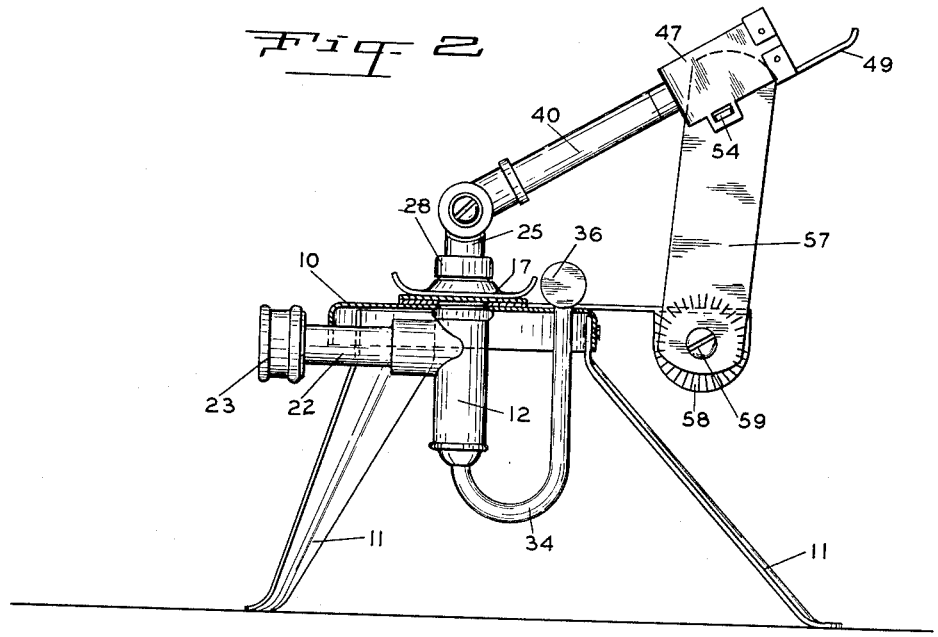
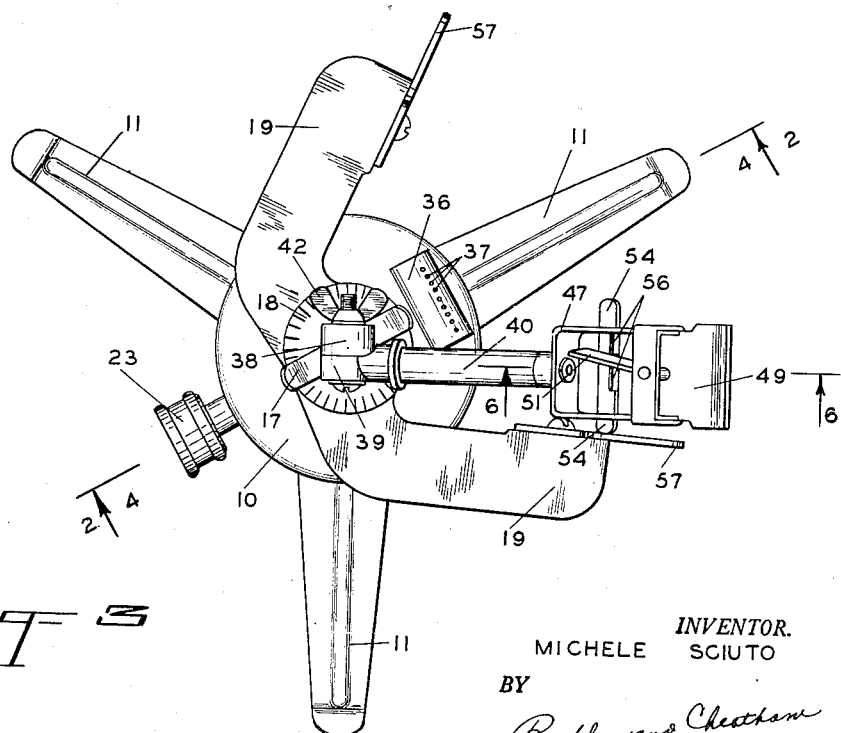
INVENTOR.
MICHELE SCIUTO
BY
Buckhorn and Cheatham
ATTORNEY Patented Apr. 6, 1954

2,674,492

UNITED STATES PATENT OFFICE 2,674,492

LAWN SPRINKLER

Michele Sciuto, Portland, Oreg.

Application May 19, 1953, Serial No. 355,988

3 Claims. (Cl. 299—71)

My present invention comprises an improvement in lawn sprinklers, the device having for its principal object the provision of means whereby the size and shape of the area sprinkled thereby may be varied to considerable extents.

A further object of the present invention is to provide a sprinkling device of the character described which may be adjusted to throw a jet spray over the tops of shrubs and the like, or to spray the ground beneath the shrubs in order to protect certain types of plants and flowers from water damage.

A further object of the present invention is to provide means of the foregoing character including a pivot tube and a water inlet tube, in which the pivot tube is floated in water so that it will pivot easily, without having a water jet created beneath the sprinkling device which would dig wash-out holes in the ground.

The foregoing and other objects and advantages of the present invention will be more readily apparent from inspection of the accompanying drawings taken in connection with the following specification and in which like numerals refer to like parts throughout.

In the drawings,

Fig. 1 is a view in perspective of the present invention;

Fig. 2 is a vertical section of the present invention taken substantially along line 2—2 of Fig. 3;

Fig. 3 is a plan view of the invention;

Fig. 4 is a vertical section of the inlet assembly taken substantially along line 4—4 of Fig. 3;

Fig. 5 is a vertical section taken substantially along line 5—5 of Fig. 4; and

Fig. 6 is a vertical section taken substantially along line 6—6 of Fig. 3.

The sprinkler of the present invention comprises a supporting structure including a top 10 and a plurality of legs 11 which support the top above the ground. The top is provided with a central opening therethrough and a water inlet member 12 is mounted on the supporting structure and includes a threaded upper portion 14 extending through the opening in the top. The upwardly projecting portion of the inlet member is provided with a smooth surfaced, thin portion 15 above the threaded portion 14 and is also provided with an annular flange 16 below the threaded portion 14. A wing nut 17 engages the threaded portion to support the inlet member 12 in position. The radially fluted inner end portions 18 of a pair of radially extending arms 19 are pivotally mounted on the threaded portion 14 between the top 10 and the lower surface of the nut 17. Loosening of the nut permits angular adjustment of the arms 19 so that the spacing of the outer ends thereof may be regulated.

The inlet member 12 is in the form of a T-fitting including the upwardly projecting portion, a downwardly projecting arm 20 and a laterally projecting inlet leg 21 into which the end of a short pipe 22 is fixed. The outer end of the pipe 22 supports a hose coupling 23 whereby the sprinkler may be attached to a source of water under pressure. The aligned upper and lower arms of the T-fitting provide a vertically disposed socket, the interior of which is smoothly finished, and an intermediate portion of which is enlarged, as indicated at 24, adjacent the inlet leg 21.

A pivot tube 25 is rotatably journaled in the socket, being somewhat snugly journaled in spaced upper and lower portions thereof but still having sufficient clearance so that rotation of the pivot tube in the socket is not substantially impeded by friction and so that water under pressure may lubricate the adjacent surfaces to permit free pivoting movement of the pivot tube. An intermediate portion of the pivot tube is provided with a plurality of inlet perforations 26 in communication with the enlargement 24 so that water enters the pivot tube. A plug 27 is soldered into the pivot tube beneath the perforations 26 so as to close the lower end thereof. A depending, concentric, annular flange 28 is fixed to the upwardly projecting portion of the pivot tube 25 and telescopes with the smoothly finished portion 15 of the inlet tube to provide a rotating water seal therebetween at the upper end of the assembly. An annular flange 29 soldered into the inlet tube supports the pivot tube when the water pressure is relieved. The plug 27 is provided with a threaded central aperture in which is engaged the threaded end of an axially extending screw 30 having its head 31 positioned below the flange 29. A spiral spring 32 is compressed between the head of the screw 31 and the flange 29 in order resiliently to maintain the pivot tube in the inlet tube. The degree of compression of the spring may be adjusted by turning the screw 30 in order to regulate the degree of resistance of the pivot tube to turning movement and thereby adjust the sprinkling action to accommodate different water pressures. A reducer 33 is fixed into the lower end of the inlet tube and a U-shaped tube 34 is soldered into the reducer. The tube 34 has a leg 35 projecting upwardly through a small opening in the top 10 and a fixed sprinkler head 36 is fixed to the end of the tube above the top. The sprinkler head is in the form of a small cylinder and is provided with a plurality of small perforations 37 directed upwardly and radially outwardly. The lubricating water which escapes from between the inlet tube and the pivot tube is thus forced outwardly in the form of fine sprays, rather than being permitted to dig washout holes beneath the sprinkler.

The upper end of the pivot tube 25 is shaped to provide one part 38 of an adjustable elbow, the other part 39 of which supports a jet tube 40. Two two parts are held together by means of a horizontally disposed screw 41 and wing nut 42, friction washers 43 and 44 being provided to maintain the elbow in adjusted position. The angle of inclination of the jet tube 40 may thereby be fixed as desired.

A jet nozzle 45 fixed in the end of the jet tube 40 is provided with a central jet opening 46 of small diameter so that a forceful jet is directed radially outward from the sprinkler. The nozzle assembly includes a U-shaped strap 47 having forwardly directed arms at each side of the nozzle. The outer ends of the arms are braced by a cross brace 48 and an opposed deflection plate 49. A pivot 50 is mounted in the brace 48 and plate 49, the pivotal axis lying in a vertical plane in alignment with the axis of the nozzle opening 46. A displaceable member comprising a flag 51 and a portion 52 thereof wrapped around the pivot 50 extends inwardly between the arms of the U-shaped strap toward the tip of the nozzle opening 46. Each of the arms of the strap 47 is provided with a downwardly projecting tab 53 having a guide slot therein through which opposed end portions 54 of a laterally extending shifting member 55 extend. The shifting member 55 is provided with a pair of upwardly projecting tabs 56 providing a shifting fork embracing the lower edge of the flag 51. Either projecting portion 54 may be engaged to shift the angular position of the flag 51 thereby presenting either one of the opposed flat surfaces of the shifting member to the jet. The jet stream is thereby broken up and some of its energy is expended to cause rotation of the pivot tube. The rounded portion 52 further breaks up the jet stream into relatively fine spray which still has sufficient force to reach a long distance radially.

An elongated abutment member 57 is pivotally mounted in a vertical plane on a ribbed tab 58 depending from the outer end of each arm 19. A screw 59 and wing nut 60 hold the ribbed tab 58 against a similarly ribbed end portion of the abutment member 57. The abutment members may therefore be moved from upwardly projecting positions in the path of the projecting portions 54 to inoperative positions below the plane of the top 10. The abutment members are quite long and wide so that the shifting member will be engaged thereby in any operative position of the nozzle. The displaceable flag 51 is thereby alternately displaced to present one or the other of its surfaces to the jet, thereby causing the spray to be oscillated through an arc determined by the angular spacing of the arms 19. The jet nozzle may oscillate through any desired portion of a complete circle, or may be permitted to rotate continuously in one direction by lowering the abutments.

By rotating the nozzle tube 40 through approximately one hundred and eighty degrees when the wing nut 42 is loosened, the deflector plate 49 may be positioned lowermost or uppermost. This is particularly desirable when it is necessary to throw a spray close to the ground and prevent water from striking the foliage or flowers of the plants.

Having illustrated and described a preferred embodiment of the present invention, it should be apparent to those skilled in the art that the same permits of modification in arrangement and detail. I claim as my invention all such modifications as come within the true spirit and scope of the appended claims.

I claim:

1. A lawn sprinkler comprising a supporting structure including a top having an opening therethrough, a water inlet member depending from said top and including a portion extending upwardly through said opening, said inlet member having an upwardly opening, vertical socket therein and a connecting passage to admit water to an intermediate portion of said socket, said intermediate portion being of greater diameter than the upper and lower portions of said socket, a pivot tube journaled in the restricted upper and lower portions of said socket and having a portion projecting above said inlet members, said pivot tube being perforated in an intermediate portion of the wall thereof whereby water may pass into said pivot tube from the enlarged portion of said socket, a plug closing the lower end of said pivot tube, a dependent sealing flange on the upwardly extending portion of said pivot tube and engaging the outer surface of the upper end of said water inlet member, an adjustable elbow mounted on and communicating with said pivot tube, a nozzle mounted on said elbow, a displaceable member pivotally mounted on said nozzle and including a pair of surfaces against either of which the stream from said nozzle may impinge at an acute angle whereby the stream is broken and some of the force thereof is expended to cause rotation of said nozzle about the axis of said socket, the direction of rotation thereof depending upon the one of said two surfaces against which the stream impinges, a shifting member slidably mounted on said nozzle and operatively connected to said displaceable member, said shifting member having opposed portions projecting laterally with respect to the axis of said nozzle, a pair of radially extending arms pivotally mounted on said top, friction means to retain said arms in any desired angular relation to each other, an abutment member pivotally mounted on each of said arms and adjustably movable from a depending position to an upwardly extending position in the path of movement of said shifting member, friction means to retain each of said arms in the path of the projecting portions of said shifting member regardless of the angular adjustment of said elbow whereby an oscillating spray covering any desired segment of a circle and at any desired inclination to the ground may be created, or a continuously rotating spray may be achieved upon dropping said abutment members below the path of said shifting means, and resilient means biased between said inlet member and said inlet tube to maintain said sealing flange in sealing engagement with said inlet member.

2. A lawn sprinkler comprising a supporting structure including a top having an opening therethrough, a water inlet member fixed to said top, said inlet member having an upwardly opening, vertical socket therein having an intermediate portion of greater diameter than the upper and lower portions of said socket, a pivot tube journaled in the restricted upper and lower portions of said socket and having a portion projecting above said inlet member, said pivot tube being perforated in an intermediate portion of the wall thereof whereby water may pass into said pivot tube from the enlarged portion of said socket, a plug closing the lower end of said pivot tube, a sealing flange on the upwardly extending portion of said pivot tube and engaging the outer surface of the upper end of said water inlet member, an adjustable elbow mounted on and communicating with said pivot tube, a nozzle assembly mounted on said elbow, a displaceable member pivotally mounted on said nozzle assembly and including a pair of surfaces against either of which the stream from said nozzle may impinge at an acute angle whereby the stream is broken and some of the force thereof is expended to cause rotation of said nozzle about the axis of said socket, the direction of rotation thereof depending upon the one of said two surfaces against which the stream impinges, a shifting member slidably mounted on said nozzle and operatively connected to said displaceable member, said shifting member having opposed portions projecting laterally with respect to the axis of said nozzle, a pair of radially extending arms pivotally mounted on said top, friction means to retain said arms in any desired angular relation to each other, an abutment member pivotally mounted on each of said arms and adjustably movable from a depending position to an upwardly extending position in the path of movement of said shifting member, means to retain each of said arms in the path of the projecting portions of said shifting member regardless of the angular adjustment of said elbow whereby an oscillating spray covering any desired segment of a circle and at any desired inclination to the ground may be created, or a continuously rotating spray may be achieved upon dropping said abutment members below the path of said shifting means, said inlet member having an internal flange thereon, said plug having a central threaded opening therethrough in the longitudinal direction of said inlet tube, said pivot tube having its lower end resting upon said internal flange, a screw extending longitudinally of the inlet tube in threaded engagement with said threaded opening in the plug and having its head positioned downwardly from said annular flange, and a spiral spring compressed between the head of said screw and said annular flange.

3. A lawn sprinkler comprising a supporting structure including a water inlet member fixed to said top, said inlet member having an upwardly opening, vertical socket therein and a connecting passage to admit water to an intermediate portion of said socket, said intermediate portion being of greater diameter than the upper and lower portions of said socket, a pivot tube journaled in the restricted upper and lower portions of said socket and having a portion projecting above said inlet member, said pivot tube being perforated in an intermediate portion of the wall thereof whereby water may pass into said pivot tube from the enlarged portion of said socket, a plug closing the lower end of said pivot tube, a dependent sealing flange on the upwardly extending portion of said pivot tube and engaging the outer surface of the upper end of said water inlet member, an adjustable elbow mounted on and communicating with said pivot tube, a nozzle assembly mounted on said elbow, a displaceable member pivotally mounted on said nozzle assembly and including a pair of surfaces against either of which the stream from said nozzle may impinge at an acute angle whereby the stream is broken and some of the force thereof is expended to cause rotation of said nozzle assembly about the axis of said socket, the direction of rotation thereof depending upon the one of said two surfaces against which the stream impinges, a shifting member slidably mounted on said nozzle and operatively connected to said displaceable member, said shifting member having opposed portions projecting laterally with respect to the axis of said nozzle, a pair of radially extending arms pivotally mounted on said top, means to retain said arms in any desired angular relation to each other, an abutment member pivotally mounted on each of said arms and adjustably movable from a depending position to an upwardly extending position in the path of movement of said shifting member, means to retain each of said arms in the path of the projecting portions of said shifting member regardless of the angular adjustment of said elbow whereby an oscillating spray covering any desired segment of a circle and at any desired inclination to the ground may be created, or a continuously rotating spray may be achieved upon dropping said abutment members below the path of said shifting means, said inlet member having an internal flange thereon, said plug having a central threaded opening therethrough in the longitudinal direction of said inlet tube, said pivot tube having its lower end resting upon said internal flange, a screw extending longitudinally of the inlet tube in threaded engagement with said threaded opening in the plug and having its head positioned downwardly from said annular flange, a spiral spring compressed between the head of said screw and said annular flange, a tube communicating with the lower end of said inlet member, and a sprinkler head affixed to the free end of said tube.

References Cited in the file of this patent

UNITED STATES PATENTS

| Number | Name | Date |
|---|---|---|
| 1,144,070 | Schneider | June 22, 1915 |
| 2,022,396 | Wiederhold | Nov. 26, 1935 |